United States Patent [19]

Blounts

[11] Patent Number: 4,842,650

[45] Date of Patent: Jun. 27, 1989

[54] POLYMER MODIFIED CEMENT COMPOSITIONS

[75] Inventor: Wayne J. Blounts, Las Vegas, Nev.

[73] Assignee: Sencon Systems Incorporated, Northbrook, Ill.

[21] Appl. No.: 850,494

[22] Filed: Apr. 11, 1986

[51] Int. Cl.[4] ........................ C04B 16/12; C04B 24/28

[52] U.S. Cl. ........................................ 106/90; 106/99; 106/314; 524/5

[58] Field of Search ................ 106/90, 314, 99; 524/5

[56] References Cited

U.S. PATENT DOCUMENTS

| | | | |
|---|---|---|---|
| 1,283,546 | 11/1918 | Olson | 106/90 |
| 3,295,278 | 1/1967 | Muhm | 52/223 |
| 3,645,961 | 2/1972 | Goldfein | 106/90 |
| 3,782,983 | 1/1974 | Komor | 106/88 |
| 3,883,359 | 5/1975 | Harvey | 106/90 |
| 3,984,957 | 10/1976 | Piazza | 52/309 |
| 4,010,232 | 3/1977 | Labrecque | 264/464 |
| 4,058,406 | 11/1977 | Raponi | 106/90 |
| 4,249,948 | 2/1981 | Okada et al. | 106/88 |
| 4,261,754 | 4/1981 | Krenchel et al. | 106/90 |
| 4,304,704 | 12/1981 | Billings | 524/5 |
| 4,339,273 | 7/1982 | Meier et al. | 109/90 |
| 4,363,666 | 12/1982 | Johnson et al. | 106/90 |
| 4,363,667 | 12/1982 | Birchall et al. | 106/90 |
| 4,390,372 | 6/1983 | Hardin | 106/90 |
| 4,410,366 | 10/1983 | Birchall et al. | 106/90 |
| 4,414,030 | 11/1983 | Restrepo | 106/90 |
| 4,434,257 | 2/1984 | Narisawa et al. | 106/90 |
| 4,494,990 | 1/1985 | Harris | 106/90 |

FOREIGN PATENT DOCUMENTS

| | | | |
|---|---|---|---|
| 49-20048 | 5/1974 | Japan | 106/90 |
| 58-15569 | 1/1983 | Japan | 106/90 |
| 1586512 | 3/1981 | United Kingdom . | |

OTHER PUBLICATIONS

A two page specification sheet from The Fibermesh Company, Chickamauga, GA 30707, entitled "Fibermesh Facts".

A one page specification sheet from Air Products and Chemicals, Inc., Allentown, PA 18105, entitled "AIRFLEX RP—245, Redispersible Powder".

A twenty—four page brochure from GAF Corporation, New York, NY 10020, entitled "Igepon Anionic Surfactants";

A six—page brochure from American Colloid Company, Skokie, IL 60077, entitled "4.9/Am—The Miracle in Mortar . . . Easy Spread".

Five pages of specification on Ottowa Silica Product Data from Ottawa Silica Company, Ottawa, IL;

A two page ICBO evaluation report, Report No. 3959, dated Jan. 1984.

A sixteen page brochure from Sencon Systems, Northbrook, IL 60062, entitled "7.13 SEN—Sencon Systems Brings Energy Costs Back Down to Earth".

*Primary Examiner*—Steven Capella

*Attorney, Agent, or Firm*—Willian Brinks Olds Hofer Gilson & Lione Ltd.

[57] ABSTRACT

Various improvements for polymer modified cementitious compositions are disclosed. A dry mix for making a polymer modified cementitious composition especially useful as a stucco material, which includes a dry, redispersible, non-reemulsifiable polymer at a polymer-cement ratio of between about 0.04:1 to about 0.15:1, is disclosed. Also, the use of sodium acyl (coco) isethionate as a superior wetting agent in polymer modified cementitious composition is disclosed. In addition, the use of non-bridging, plastic fibers for use in pumpable cementitious compositions is disclosed.

25 Claims, 1 Drawing Sheet

POLYMER MODIFIED CEMENT COMPOSITIONS

BACKGROUND OF THE INVENTION

This invention relates to polymer modified cementitious compositions; and more particularly to polymer modified cementitious compositions used as stucco and similar coatings.

The use of cementitious composition to provide durable wall surfaces are well known. One common example is stucco, which may provide a durable and/or decorative coating over various substrates. One application to which the present invention is particularly well suited is a hard, durable finish applied to exterior insulation.

Thin layers of cementitious compositions, such as stucco, are prone to cracking and dehydration. Thus various additives have been used to modify the basic cementitious compositions characteristics. Many building contractors have used polymers to modify stucco compositions. Typically a polymer-water emulsion is admixed with cementitious composition at the job site. While an improvement over non-polymer modified cementitious compositions, this procedure has several disadvantages.

First, there is a tendency for contractors to use less than the recommended polymer levels to reduce expense, since the polymers are generally quite expensive compared to other cementitious composition ingredients. When the polymer comes in a liquid suspension, it is easy for the contractor to just add more water and less liquid polymer when mixing the ingredients of the stucco.

Another drawback to liquid polymers is the freight costs for shipping the weight and volume added by the water. Additionally, such water-polymer emulsions must be protected from freezing. Perhaps the most serious drawback is that the polymers in such emulsions tend to settle out over time. Thus, depending on the time since its manufacture, the polymer concentration will vary over the heighth of the container in which it is stored. A contractor, if not careful to remix the emulsion, may pour off from the top of a container an insufficient amount (or if from the bottom of the container, an excess amount) of polymer to admix with the cementitious composition, even though the recommended volume of polymer emulsion is used.

In addition to the drawbacks of using a water-polymer emulsion, the polymer itself may result in undesirable side effects. In humid conditions, a stucco containing a reemulsifiable polymer will tend to soften as moisture in the air wets the polymer in the stucco, even after the stucco ages the required amount of time to cure. This makes the stucco less durable, and may also lead to mildew formation.

There are other aspects of common stucco compositions where additives, while improving the basic cementitious composition characteristics, also present difficulties. Fiberglass fibers may be used to improve the strength characteristics of the cementitious composition. However, because of the alkaline nature of cement, the strength of these fibers are destroyed over time. Thus alkaline-resistant coatings have been applied to fibers used for this purpose. The result has not always been successful as the coating may be scrubbed off as the fibers are mixed into the aggregatecontaining cementitious composition.

The cost of a stucco wall is heavily influenced by the cost of labor to apply the cementitious coating to the wall. It is very desirable to have a cementitious composition which can be pumped, allowing faster application and thus reduced labor costs. However, as a practical matter, it has not heretofore been possible to pump common base coat compositions containing fibers, partly because the fibers, especially fiberglass, tend to bridge across the passageways and orifices of the pumping appartus, plugging it up.

Another difficulty in producing a desirable cementitious composition is finding compatable additives so that when combined, the additives provide the desired characteristic without producing adverse influences on other additives. For example, some additives, such as wetting agents, which may be used to make the cementitious composition more fluid, may not be compatible with polymers used to improve the cured characteristics of the composition.

Finally, the size distribution of aggregate used in the cementitious composition may often produce inferior cementitious compositions, especially in thin layer applications.

Producing a cementitious composition with a combination of superior strength characteristics and ease of application requires the simultaneous solution to these and other problems.

SUMMARY OF THE INVENTION

An improved polymer modified cementitious composition has been discovered which is particularly useful in stucco applications. Several unique aspects of the invention combine in the preferred embodiment to yield simultaneous improvements in each of the above mentioned areas.

In one aspect, the invention relates to a dry mix for making a polymer modified cementitious composition wherein the dry mix comprises sand and cement in a ratio of between about 1.75:1 and 3.5:1, fibers in a range of about 0.15% to about 0.5% of the dry mix and a dry, redispersible polymer in a polymer cement ratio of between about 0.04:1 and about 0.15:1. In another aspect, the invention relates to the use of sodium acyl (coco) isethionate as a superior wetting agent for use in polymer modified cementitious compositions. This invention also relates to cementitious compositions which include plastic fibers which do not bridge during pumping application, primarily polypropylene, polyethylene or nylon.

DETAILED DESCRIPTION OF THE DRAWINGS AND THE PREFERRED EMBODIMENTS OF THE INVENTION

Figure 1:
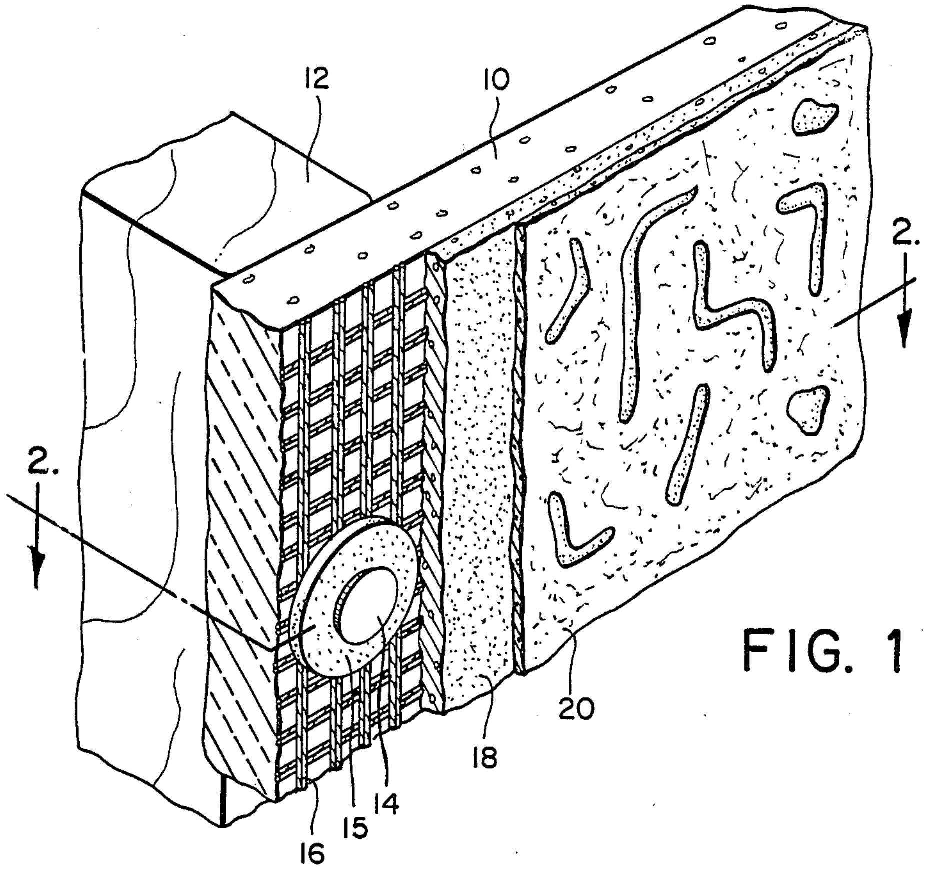
FIG. 1 is a partial sectional prospective view of a wall system using the preferred polymer modified cementitious composition of the present invention.
Figure 2:
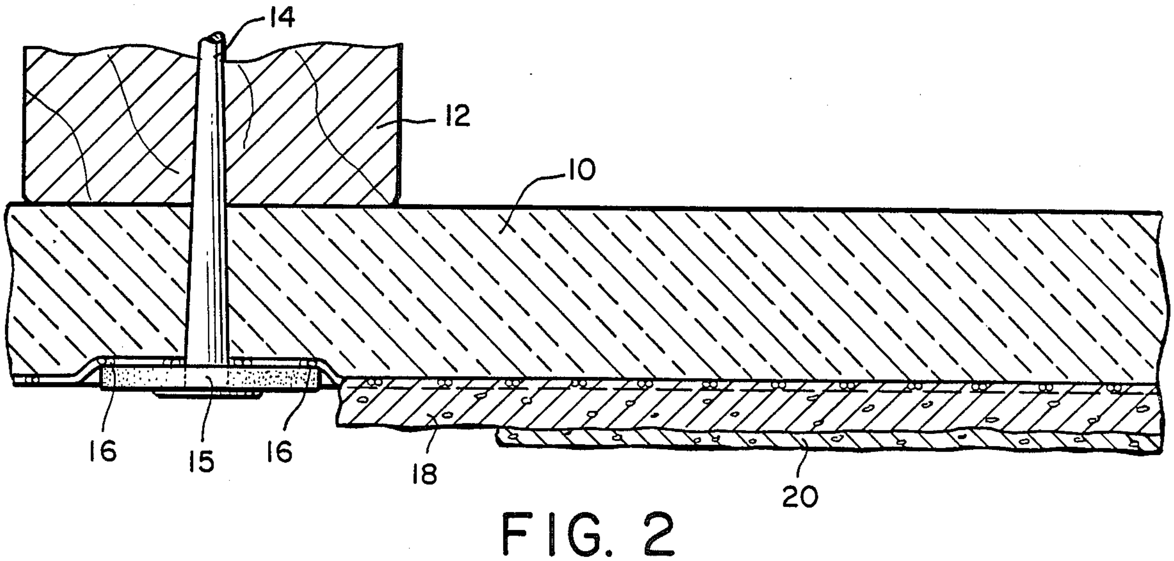
FIG. 2 is a sectional view taken along line 2—2 of FIG. 1.

An application to which the present invention is particularly well suited is a stucco composition covering an exterior insulation board. As shown in FIGS. 1 and 2, an extruded polystyrene insulation board 10 is anchored to a wall stud 12 by means of an anchor 14 and a washer 15. A reinforcing mesh 16 is affixed on the exterior surface of the panel 10 to help support a stucco base coat 18. Covering the base coat 18 is a finish coat 20, which may be textured in various manners, depending on architectural preference. One texture example is depicted in FIG. 1. An optional paint or other sealing layer may be applied to the surface of the finish coat 20.

The present invention primarily relates to the composition of the base coat 18. There are several ways in which the base coat 18 made according to present invention is superior over other cementitious compositions. In the preferred embodiment, the base coat is prepared from a dry mix to which only water is added. A dry, redispersible polymer is provided in the dry mix, which also contains sand, cement, fibers and other optional ingredients. The ratio of polymer to cement is between about 0.04:1 and about 0.15:1, most preferably the ratio is about 0.1:1. The sand cement ratio of the dry mix, when used for a base coat, is between about 1.75:1 and about 3.5:1, most preferably about 2:1. The fibers in the dry mix are in a range of about 0.06% to about 0.4% of the total dry mix weight.

Conventional fiberglass and alkali resistant fiberglass fibers may be used in this aspect of the invention, but as explained more fully hereinafter, polypropylene fibers are preferable. Also, a wetting agent, such as an anionic surfactant, may be included in the dry mix of this aspect of the present invention. When the composition of the present invention is used as a stucco base coat over insulation boards, the cement is preferably low alkali Type I or Type II Portland cement meeting ASTM C150 specifications and having a maximum alkalinity of 0.6%. Cement alkalinity affects hardness (final performance) and workability.

The use of a dry polymer allows pre-mixing of the polymer with the other ingredients by the base coat dry mix supplier, removing the possibility that a contractor will alter the polymer-cement ratio during mixing. The use of a dry polymer also reduces freight expenses due to shipping the water associated with polymer emulsions, eliminates the problem of freezing and eliminates problems associated with the settling of polymers within water emulsions during storage.

It is preferred that a redispersible, non-reemulsifiable dry polymer be used. The term redispersable means that the dry polymer may be evenly dispersed in water-containing cementitious compositions. The term non-reemulsifiable characterizes those polymers which, after curing in cementitious compositions, do not get soft if water comes in contact with the cementitious composition. It is not always certain how various polymers, which may be non-reemulsifiable in other contexts, will behave in cementitious compositions. As used herein the term non-reemulsifiable denotes polymers which, when used in cementitious compositions, will not appreciably reemulsify after emulsifying and curing (dehydrating) two or three times. Non-reemulsifiable polymers include polyvinyl acetate, polyvinyl chloride and vinyl acetate-ethylene copolymers. A preferred dry, redispersible, non-reemulsifiable polymer for stucco base coat compositions is Airflex™ RP-245, a vinyl acetate-ethylene copolymer available from Air Products and Chemicals, Inc., Box 538 Allentown, PA 18105.

Another aspect of the present invention is the use of sodium acyl (coco) isethionate, an anionic surfactant, as a wetting agent in polymer modified cementitious compositions. Sodium acyl (coco) isethoniate improves the air entraining ability of the cementitious compositions. This makes it easier to pump and apply the cementitious composition because the material does not form a skin as it starts to cure. The wetting agent also helps the cementitious compositions retain water, which is important in thin layer applications where the compositions could otherwise dehydrate before they finish curing. Once cured, the entrained air provides improved freeze-thaw stability to the compositions.

In the preferred embodiment of the present invention, sodium acyl (coco) isethionate is used at a level of about 0.02% to about 0.15%, most preferably at about 0.1%, be weight of the dry ingredients of the cementitious compositions. If used with the dry mix previously disclosed, a dry powdered form of sodium acyl (coco) isethionate may be preblended with the other ingredients of the dry mix and shipped to the construction site on a "just add water" basis. A preferred sodium acyl (coco) isethionate is available in powder form as Igepon® AC-78 from GAF Corporation, 140 West 51st Street, New York, NY 10020.

Sodium acyl (coco) isethoniate has been found to be a superior wetting agent in polymer modified cementitious compositions containing vinyl acetate-ethylene copolymers, because of the compatibility of the two compounds. Sodium acyl (coco) isethoniate is believed to improve the surface tension of vinyl acetate-ethlyene copolymers, improving the open time (the period in which the material can be worked) of cementitious compositions containing this polymer.

As a further improvement to the pumpability of cementitious compositions, it has been found that certain plastic fibers are particularly useful due to their flexibility (preventing plugging by bridging) and due to their resistance to the alkalinity of the cementitious compositions. In this regard, polypropylene, polyethylene or nylon fibers are preferred in stucco base coat composition. Most preferred for use in cementitious compositions of the present invention are polypropylene fibers of about 15 dernier thickness. The fibers are preferably between about one-eighth inch and one and one-quarter inches in length, most preferably about three-quarters inch in length. Suitable fibers are Harbourite 120 polypropylene fibers, available from Fibermesh Company, 309 Lafayette Road, Chickamauga, GA 30707.

Polypropylene fibers do not suffer the disadvantage of corroding over time in cementitious compositions, and thus continue to provide flexial and tensile strength over the life of the base coat composition. The fibers, as previously mentioned, are used at a range of about 0.06% to about 0.4% of the dry ingredient weight, preferably in a range of between about 0.14% and about 0.3% and most preferably at about 0.28%. In these ranges, the fibers are in sufficient quantity to provide the flexial and tensile strength improvements desired. Beyond these amounts the extra fibers do little to add additional strength, and at high levels could even degrade basic strength characteristics of cementitious compositions in which they are used.

Aggregate size distributions have been discovered which are preferred in making cementitious compositions of the present invention to be used in stucco applications. All sand sieve numbers used herein are U.S. standard sieve sizes. In the preferred embodiment of a base coat composition, the sand comprises clean sand with a sieve analysis of about:

| | |
|---|---|
| #20 and larger | 0% to 6% |
| #30 | 0% to 18% |
| #35 and #40 | 4% to 14% |

-continued

| | |
|---|---|
| #50 | 2% to 30% |
| #60 and #70 | 0% to 67% |
| #100 | 8% to 28% |
| #140 | 1% to 9% |
| #200 and smaller | 0% to 7% |

It must be understood that some of the large ranges in the above description (such as 0% to 67% #60 and #70) result from the fact that the amount of some sizes can be reduced or completely eliminated if suitable amounts of just larger and just smaller (such as #50 and #100) particles are used. A more preferred sand sieve analysis is about:

| | |
|---|---|
| #20 and larger | 0% to 2% |
| #30 | 3% to 17% |
| #35 and #40 | 5% to 14% |
| #50 | 12% to 30% |
| #60 and #70 | 17% to 42% |
| #100 | 12% to 22% |
| #140 | 3% to 9% |
| #200 and smaller | 1% to 5% |

Most preferred for a base coat composition is sand with a sieve analysis of about:

| | |
|---|---|
| #20 and larger | 1% |
| #30 | 11% |
| #35 and #40 | 9% |
| #50 | 12% |
| #60 and #70 | 42% |
| #100 | 18% |
| #140 | 5% |
| #200 and smaller | 2% |

In applications where very thin layers of cementitious compositions will result, it is useful to increase the amount of fines used in the aggregate. The #200 and smaller particles have been found useful at levels of about 12% of the total aggregate, proportionately reducing the amount of larger aggregate.

When making up small batches of a dry mix of the present invention, a sand with a preferred sand sieve analysis may be produced by combining commercially available sand blends. For example, when using silica sand blends available from Ottawa Silica Company, Ottawa, Illinois, the preferred dry mix base coat formulation (with the above discussed large amounts of fines) includes about:

7% Ottawa silica flour blend #295,
9% Ottawa silica sand blend #20,
9% Ottawa silica sand blend #30 and
40% Ottawa silica sand blend #60.

Of course other brands of silica sand and flour blends similar to the Ottawa blends may be used. Ottawa reports that their silica blends have the following sieve analyses:

A. Ottawa silica flour blend #295

| U.S. Sieve No. | Mean % on Sieve |
|---|---|
| 70 | — |
| 100 | — |
| 140 | 0.5 |
| 200 | 3.0 |
| 270 | 6.7 |
| 325 | 6.7 |

-continued

| U.S. Sieve No. | Mean % on Sieve |
|---|---|
| PAN | 83.0 |

B. Ottawa silica sand blend #20

| U.S. Sieve No. | Mean % on Sieve |
|---|---|
| 16 | — |
| 20 | 3.0 |
| 30 | 69.0 |
| 40 | 22.0 |
| 50 | 5.0 |
| PAN | 1.0 |

C. Ottawa silica sand blend #30

| U.S. Sieve No. | Mean % on Sieve |
|---|---|
| 30 | 3.0 |
| 40 | 37.0 |
| 50 | 45.0 |
| 70 | 13.0 |
| 100 | 1.5 |
| PAN | 0.5 |

D. Ottawa SIlica sand blend #60

| U.S. Sieve No. | Mean % on Sieve |
|---|---|
| 50 | 7.0 |
| 70 | 58.0 |
| 100 | 25.0 |
| 140 | 7.5 |
| 200 | 1.5 |
| 270 | 0.5 |
| PAN | 0.5 |

E. Ottawa silica sand blend #12

| U.S. Sieve No. | Mean % on Sieve |
|---|---|
| 8 | 1.5 |
| 10 | 16.5 |
| 12 | 38.0 |
| 16 | 38.0 |
| 20 | 5.0 |
| PAN | 1.0 |

The preferred sand sieve combinations provide good dispersion of the other ingredients (particularly due to the presence of the silica flour) and also produce a finished product with a desirable mix of particle sizes, resulting in improved compressive strength in the cured product. Other sand sieve combination will be desired in different applications. For a finish coat 20, especially depending on the desired texture, the amount and size of the larger aggregate is very important.

Other ingredients found useful in some cementitious compositions may of course be used with cementitious composition of the present invention. One example is the use of a mortar plasticizer, such as Easy Spread TM from American Colloid Company, 5100 Suffield Court, Skokie, IL 60077. Such additional ingredients may be used to retard set times, or to meet requirements for use with different aggregate finishes, for use in different climatic conditions or for use over different substrates.

Following are two examples of preferred dry mix compositions of the present invention for use as a stucco base coat.

EXAMPLE 1

30.92% Type I, low alkali Portland Cement
7.27% Ottawa silica flour blend #295
9.09% Ottawa sand blend #20
9.09% Ottawa sand blend #30
40.02% Ottawa sand blend #60
0.11% Igepon® AC-78
0.28% Polypropylene Fibers, ¾", 15 dernier
3.18% Airflex™ RP-245

The dry mix of Example 1 is packaged in 80 lb. bags and shipped to a construction site where each bag is mixed with approximately two gallons of water in a paddle mortar mixer for 5 minutes, allowed to "slak" for 3 to 5 minutes with the paddles disengaged, then mixed for an additional 5 minutes. The resulting composition may be spray applied, using a stator tube type pump, over an exterior, extruded polystyrene insulation board. At ⅛ inch thick, the stucco made from one bag provides coverage for approximately 110-120 square feet of wall surface.

EXAMPLE 2

31% low alkali, Type I Portland cement
7% Ottawa silica flour blend #295
9% Ottawa sand blend #20
9% Ottawa sand blend #30
41% Ottawa sand blend #60
0.06% Igepon® AC-78
0.2% Polypropylene fibers, ¾", 15 dernier
2.4% Airflex™ RP-245
0.5% Easy Spread™ (mortar plasticizer)

The dry mix of Example 2 is mixed and used as in Example 1.

Aspects of the present invention are useful in making dry mixes for other applications, such as the finish coat 20 of FIGS. 1 and 2.

EXAMPLE 3 (Fine Finish)

22.2% low alkali, Type I, gray, Portland, cement
8.8% Ottawa silica flour blend #295
44.4% Ottawa silica sand blend #60
11.1% #30 Ottawa silica sand blend #30
11.1% #20 Ottawa silica sand blend #20
0.14% Igepon® AC-78
2.2% Airflex™ RP-245

The dry mix of Example 3 is mixed as in Example 1 and used as a fine finish over a base coat, as produced in Example 1, to give a combined thickness of ¼ inch.

EXAMPLE 4 (Course Finish)

20% low alkali, Type I, gray, Portland cement
8% Ottawa silica flour blend #295
40% Ottawa silica sand blend #60
10% Ottawa silica sand blend #30
10% Ottawa silica sand blend #20
10% Ottawa silica sand blend #12
0.12% Igepon® AC-78
2% Airflex™ RP-245

The dry mix of example 4 is mixed as in Example 1 and applied over a base coat, such as provided in Example 1, using various texturing technique, yielding a ¼ inch thick (at its thinnest point) combined thickness.

The wall system depicted in FIGS. 1 and 2 may be made using one inch thick insulation board 12 having 1.3 pcf density. A few anchors 14 with washers 15 may be used to hold the insulation board 12 in place while the reinforcing mesh 16 is affixed. Additional anchors 14 and washers 15 are then used to secure the mesh and insulation boards to the wall structure. The insulating board 12 may be attached to various substrates using appropriate fastening means, such as anchors for poured concrete or concrete block walls and screws for metal or wood stud walls. In the prferred method of attachement, one and one-eighth inch neoprene gasketed, galvanized washers are used. Such washers are available form Aztec Washer Co., Diamond Bar, California. Like the washers, the fasteners should likwise be noncorroding. Suitable anchors and screws are well known in the art.

A polymer based adhesive may be sprayed or rolled onto the surface of the insulation board 12, coating the head of the anchors 14, the washers 15 and the mesh 16 and providing a strong adhesion between the insulation board 12 and the base coat 18. A suitable polymer adhesive is a 1 to 1 water dilution of Rohm and Haas MC-76 liquid polymer.

The benefits of the various aspects of the invention are combined in the preferred embodiment of a dry mix made into a stucco base coat. The polymer modified cementitious compositions made from preferred dry mixes of the present invention have improved workability and better coverage (because of air entrainment) compared to commonly used stucco compositions. The pumpability of the base coat significantly reduces labor costs in applying the cementitious compositions. The cured base coat composition of the preferred embodiment has superior wind load and flexural strength and adhesion. Preblending the dry polymer with other dry ingredient reduces shipping weights, avoids freezing problems, improves quality control and eliminates the problem of an incorrect amount of liquid admix being added by a contractor, either on purpose to save money or by mistake.

The preferred embodiment of the invention is for use in a stucco composition for covering exterior insulation. It will be evident that the cementitious compositions of the present invention will have many of the benefits identified herein, as well as others not specifically mentioned, when used in other applications, including, for example, self-leveling underlayments and coatings applied directly to poured concrete or concrete block walls. Besides the modifications disclosed herein, it is expected that various other changes can be made to the preferred embodiments of various aspects of the present invention without departing from the scope of the invention. It is the following claims, therefore, which define the scope of the invention.

I claim:

1. A dry mix for making a polymer modified cementitious composition, the dry mix comprising:

(a) sand and cement in a ratio of between about 1.75:1 and about 3.5:1 sand to cement;

(b) fibers in a range of about 0.06% to 0.4% of the dry mix;

(c) dry, redispersible polymer selected from the group consisting of polyvinyl acetate, polyvinyl chloride, vinyl acetate-ethylene copolymer and mixture thereof in a polymer-cement ratio of between about 0.04:1 and about 0.15:1.

2. The dry mix of claim 1 further comprising about 0.02% to about 0.15% of a wetting agent.

3. The dry mix of claim 1 wherein the cement is Type I or Type II, low alkali Portland cement.

4. The dry mix of claim 1 further comprising about 0.5% mortar plasticizer.

5. The dry mix of claim 1 wherein the sand cement ratio is about 2:1.

6. The dry mix of claim 1 wherein the sand has a sieve analysis of about:

| |
|---|
| (a) 0% to 6% #20 and larger, |
| (b) 0% to 18% #30, |
| (c) 4% to 14% #35 and #40, |
| (d) 2% to 30% #50, |
| (e) 0% to 67% #60 and #70, |
| (f) 8% to 28% #100, |
| (g) 1% to 9% #140 and |
| (h) 0% to 7% #200 and smaller. |

7. The dry mix of claim 1 wherein the sand has a sieve analysis of about:

| |
|---|
| (a) 0% to 2% #20 and larger, |
| (b) 3% to 17% #30, |
| (c) 5% to 14% #35 and #40, |
| (d) 12% to 30% #50, |
| (e) 17% to 42% #60 and #70, |
| (f) 12% to 22% #100, |
| (g) 3% to 9% #140 and |
| (h) 1% to 5% #200 and smaller. |

8. The dry mix of claim 1 wherein the dry, redispersible polymer comprises vinyl acetate-ethylene copolymer.

9. The composition of claim 1 wherein the fibers comprise polypropylene, polyethylene or nylon fibers, or mixtures thereof.

10. The composition of claim 1 wherein the fibers are between about ⅛ inch and 1¼ inches in length.

11. A polymer modified cementitious composition comprising:

(a) polymer at a polymer to cement ratio of between about 0.04:1 and about 0.15:1 and (b) about 0.02 to about 0.15% sodium acyl (coco) isethionate (on a dry basis).

12. The composition of claim 11 wherein the polymer comprises a polyvinyl acetate-ethylene copolymer.

13. A dry mix for making a polymer modified cementitious composition comprising:

(a) Type I or Type II, low-alkali Portland cement, (b) sand at a ratio of sand to cement of between about 1.75:1 and about 3.5:1, (c) about 0.02% to about 0.15% of a wetting agent, (d) between about 0.14 and about 0.3% polypropylene fibers and (e) a dry, redispersible, non-reemulsifiable polymer at a ratio of polymer to cement of between about 0.04:1 and about 0.15:1.

14. The composition of claim 13 wherein the sand has a sieve analysis of about:

| |
|---|
| (a) 0% to 6% #20 and larger, |
| (b) 0% to 18% #30, |
| (c) 4% to 14% #35 and #40, |
| (d) 2% to 30% #50, |
| (e) 0 to 67% #60 and #70, |
| (f) 8 to 28% #100, |
| (g) 1 to 9% #140 and |
| (h) 0 to 7% #200 and smaller. |

15. The composition of claim 13 wherein the sand has a sieve analysis of about:

| |
|---|
| (a) 0% to 2% #20 and larger, |
| (b) 3% to 17% #30, |
| (c) 5% to 14% #35 and #40, |
| (d) 12% to 30% #50, |
| (e) 17% to 42% #60 and #70, |
| (f) 12% to 22% #100, |
| (g) 3% to 9% #140 and |
| (h) 1% to 5% #200 and smaller. |

16. The composition of claim 13 wherein the sand has a sieve analysis of about:

| |
|---|
| (a) 1% #20 and larger, |
| (b) 11% #30, |
| (c) 9% #35 and #40, |
| (d) 12% #50, |
| (e) 42% #60 and #70, |
| (f) 18% #100, |
| (g) 5% #140 and |
| (h) 2% #200 and smaller. |

17. The composition of claim 13 wherein the sand to cement ratio is about 2:1.

18. The composition of claim 13 wherein the wetting agent is an anionic wetting agent comprising about 0.1% of the composition on a dry weight basis.

19. The composition of claim 13 wherein the wetting agent comprises sodium acyl (coco) isethionate.

20. The composition of claim 13 wherein the fibers comprise about 0.28% of the composition on a dry basis.

21. The composition of claim 13 wherein the fibers are about ¾ inch in length and about 15 denier.

22. The composition of claim 13 wherein the polymer to cement ratio is about 1:10.

23. The composition of claim 13 wherein the non-reemulsifiable polymer comprises vinyl acetate-ethylene copolymer.

24. A dry mix for a polymer modified stucco base coat composition comprising about:

(a) 31% Type I or Type II, low alkali Portland cement, (b) 65% silica sand having a sieve analysis of about

| |
|---|
| (i) 10% #20 and #30, |
| (ii) 19% #40 and #50, |
| (iii) 38% #70, |
| (iv) 16% #100, |
| (v) 8% between #100 and #325, and |
| (vi) 9% smaller than #325, |

(c) 0.1% sodium acyl (coco) isethionate, (d) 0.3% ¾ inch, 15 dernier polypropylene fibers, and (e) 3.2% powdered vinyl acetate-ethylene copolymer.

25. A dry mix for a polymer modified stucco base coat composition comprising about:

(a) 31% Type I or Type II, low alkali Portland cement, (b) 66% silica sand having a sieve analysis of about

| |
|---|
| (i) 10% #20 and #30, |
| (ii) 19% #40 and #50, |
| (iii) 38% #70 |
| (iv) 16% #100 |
| (v) 8% between #100 and #325, and |
| (vi) 9% smaller than #325. |

* * * * *